United States Patent [19]
Porterfield et al.

[11] Patent Number: 5,991,843
[45] Date of Patent: Nov. 23, 1999

[54] METHOD AND SYSTEM FOR CONCURRENT COMPUTER TRANSACTION PROCESSING

[75] Inventors: A. Kent Porterfield, New Brighton; Paul A. LaBerge, Shoreview; Joe M. Jeddeloh, Minneapolis, all of Minn.

[73] Assignee: Micron Electronics, Inc., Nampa, Id.

[21] Appl. No.: 09/176,059

[22] Filed: Oct. 20, 1998

Related U.S. Application Data

[63] Continuation of application No. 08/725,576, Oct. 3, 1996, Pat. No. 5,878,235.

[51] Int. Cl.$^6$ ........................................................... G06F 13/36
[52] U.S. Cl. ........................ 710/112; 710/102; 710/107; 710/129
[58] Field of Search .................................... 710/112, 102, 710/107, 129

[56] References Cited

U.S. PATENT DOCUMENTS

| | | | |
|---|---|---|---|
| 4,636,947 | 1/1987 | Ward | 709/101 |
| 5,193,188 | 3/1993 | Franaszek et al. | 707/8 |
| 5,327,570 | 7/1994 | Foster et al. | 712/30 |
| 5,485,586 | 1/1996 | Brash et al. | 710/112 |
| 5,615,343 | 3/1997 | Sarangdhar et al. | 710/102 |
| 5,625,778 | 4/1997 | Childers et al. | 710/107 |
| 5,682,509 | 10/1997 | Kabenjian | 710/129 |
| 5,887,139 | 3/1999 | Hagersten et al. | 709/215 |

OTHER PUBLICATIONS

Shanley and Anderson, *PCI System Architecture*, 3d ed., Addison–Wesley Publishing Company, Reading, MA, 1995, Chap. 8, "The Read and Write Transfers," pp. 129–161.

Shanley and Anderson, *ISA System Architecture*, 3d ed., Addison–Wesley Publishing Company, Reading, MA, 1995, Chap. 16, "ISA Bus Structure," pp. 335–350; Chap. 17, "Types of ISA Bus Cycles," pp. 351–364.

*Primary Examiner*—Ayaz R. Sheikh
*Assistant Examiner*—Eric S. Thlang
*Attorney, Agent, or Firm*—Seed and Berry LLP

[57] ABSTRACT

A computer system and method concurrently process transactions directed to computer devices coupled to a bus agent. The method transmits first and second transaction requests from one or more computer processors across a computer bus to the bus agent. The bus agent transmits the first transaction request to a first computer device coupled to the bus agent. In addition, the bus agent transmits the second transaction request to a second computer device before the bus agent has received a transaction response to the first transaction request from the first computer device, thereby concurrently processing the transaction requests. The bus agent includes plural device managers each uniquely associated with one of the computer devices. Each device manager employs a queue pointer into a transaction queue to track each transaction involving the computer device associated with the device. manager.

34 Claims, 4 Drawing Sheets

METHOD AND SYSTEM FOR CONCURRENT COMPUTER TRANSACTION PROCESSING

CROSS-REFERENCE TO RELATED APPLICATION

This application is a continuation of pending U.S. patent application Ser. No. 08/725,576, filed Oct. 3, 1996, and now as U.S. Pat. No. 5,878,235.

TECHNICAL FIELD

The present invention relates to computer transaction processing, and more particularly, to concurrently processing computer transactions.

BACKGROUND OF THE INVENTION

A computer system includes a set of interconnected components or modules of three basic types: central processing unit (CPU), memory, and input/output (I/O). The modules of the computer system are connected together by communication pathways known as busses. A bus is a shared transmission medium in that plural computer modules can transmit across the same bus. However, if two modules transmit during the same time period, their signals will overlap and become garbled. Therefore, it is important to ensure that only one module transmits across the bus during a given time period.

The central processing unit or processor communicates with the memory and I/O modules of the computer system using information transfers known as transactions. Each transaction includes a transaction request in which one of the computer system modules, such as the computer processor, requests the transfer of information to or from another one of the modules. For example, the computer processor could issue a transaction request that writes data to or reads data from the memory module. Each transaction also includes a transaction response that responds to the transaction request or indicates that an error has occurred.

Many computer processors, such as the Intel Pentium Pro processor, issue transaction requests in a pipelined manner in which plural transaction requests are outstanding simultaneously. For example, the Pentium Pro processor bus allows up to eight transactions to be outstanding simultaneously. With such a pipelined system, care must be taken to ensure that the transaction requests are responded to in the same order as they were issued.

Shown in FIG. 1 is a prior art computer system 10 that includes a processor bus 12. The computer system 10 includes a multiprocessor system architecture in which first and second computer processors 14, 16 are each coupled to the processor bus 12. Coupled to the first computer processor 14 is an input device 18, such as a keyboard, mouse, or microphone, that inputs information to the first computer processor from a user. The computer system 10 also includes first and second bus agents 20, 22 coupled to the first and second computer processors 14, 16 via the processor bus 12. Coupled to the first bus agent 20 is a Peripheral Component Interconnect (PCI) bus 24 which is coupled via a video controller 26 to a video monitor 28 that outputs information to the user. An Industry Standard Architecture (ISA) bus 30 also is coupled to the PCI bus 24 via a PCI/ISA bridge 32. Coupled to the ISA bus 30 are a hard drive 34 and a fax/modem 36. Coupled to the second bus agent 22 is a main memory 38.

Whenever either of the first and second computer processors 14, 16 desires to transmit information to or receive information from one of the computer devices 26, 34–38 the computer processor issues a transaction request as discussed above. In prior art computer systems, such as the computer system 10 shown in FIG. 1, the first and second processors 14, 16 and the first and second bus agents 20, 22 include transaction queues 40, 42, 44, 46, respectively, that each keep track of the outstanding transactions of the computer system 10. For example, if the first processor 14 issues a transaction request to read data from the hard drive 34, the first and second processors 14, 16 and the first and second bus agents 20, 22 insert an indication of the transaction request in their respective transaction queues 40–46. Each of the first and second processors 14, 16 and the first and second bus agents 20, 22 includes logic that prevents the transaction requests from being responded to out of the sequential order in which the transaction requests are inserted in the respective transaction queues 40–46. Thus, the transaction queues 40–46 ensure that the various transaction requests transmitted by the processors 14, 16 and bus agents 20, 22 are answered with transaction responses in the same order as the transaction requests were issued.

Although the transaction queues 40–46 enable each of the first and second processors 14, 16 and the bus agents 20, 22 to process a single transaction concurrently, none of the processors 14, 16 or bus agents 20, 22 can process plural transaction requests concurrently. For example, if the first processor 14 issues a transaction request to read data from the hard drive 34 and the second processor 16 subsequently issues a transaction request to write data to the video controller 26, the two transactions cannot be processed concurrently by the video controller 26 and the hard drive 34. Instead, the first bus agent 20 will wait until after the hard drive 34 has issued a transaction response in response to the first transaction request and the bus agent has forwarded the transaction response of the processor bus 12 to the first processor 14 before transmitting the second transaction request to the video controller 26. The first bus agent 20 will wait to send the second transaction request to the video controller 26 even if the video controller 26 is so much faster than the hard drive 34 that the video controller could respond to the second transaction request before the hard drive 34 could respond to the first transaction request.

If the first bus agent 20 transmitted the second transaction request before receiving the response to the first transaction request, then the first bus agent could transmit the second transaction response on the processor bus before transmitting the first transaction response. Transmitting the transaction responses out of order like that would cause the first processor 14 to incorrectly receive the second transaction response in response to the first transaction request. As such, the first processor 14 would be expecting data read from the hard drive 34 and instead would receive the second transaction response from the video controller indicating that data was correctly written to the video controller. Such transposing of transaction responses could quickly disable the computer system 10.

SUMMARY OF THE INVENTION

The present invention is directed to a method, system, and bus agent for concurrent transaction processing. The method transmits first and second transaction requests from one or more computer processors across a computer bus to the bus agent. The bus agent transmits the first transaction request to a first computer device. In addition, the bus agent transmits the second transaction request to a second computer device before the bus agent has received a transaction response to the first transaction request from the first computer device, thereby concurrently processing the transaction requests. The bus agent receives first and second transaction responses on the first and second computer devices respectively and transmits the first and second transaction responses to the one or more computer processors. Concurrently processing the plural transaction requests enables the bus agent to receive and transmit transaction responses to the one or more computer processors sooner than would be possible with the non-concurrent transaction processing of the prior art.

In one embodiment, the bus agent receives the second transaction response after receiving the first transaction response, but the bus agent transmits the first-transaction response on the computer bus before transmitting the second transaction response on the computer bus. In another embodiment, the method concurrently processes two transaction requests directed to the same computer device. In particular, the method transmits a third transaction request to the first computer device from the bus agent before transmitting the first transaction response to the one or more computer processors.

The preferred embodiment of the bus agent includes a transaction queue that stores indications of a plurality of transaction requests received by the bus agent from one or more computer processors via a computer bus. Also, the bus agent includes a request controller that inserts into the transaction queue the indications of the transaction requests received by the bus agent. A response controller uses the transaction queue to ensure that transaction responses responsive to the transaction requests are transmitted via the computer bus to the one or more computer processors according to the sequential order in which the transaction requests were received. In addition, the bus agent includes a plurality of device managers each associated with a respective computer device coupled to the bus agent. Each device manager is structured to transmit one of the transaction requests to the computer device associated with the device manager. In addition, each device manager receives a transaction response in response to the transaction request and signals the response controller that a transaction response is ready to be transmitted to the one or more computer processors. Each device manager stores its transaction response in the transaction queue in a transaction response field associated with the transaction request to which the transaction response is responsive. The response controller responds to the signal from the device manager by transmitting the transaction response on the processor bus.

A preferred embodiment of the computer system includes a computer processor that issues a plurality of transaction requests according to a first sequential order. The computer system also includes a plurality of computer devices for responding to the transaction requests from the computer processor. Further, the computer system includes a bus agent coupled between the plurality of computer devices and a computer bus coupled to the computer processor. The bus agent includes a plurality of device managers that keeps track of the transaction requests received from the computer processor via the computer bus. Each of the device managers is associated with a respective one of plurality of computer devices. Also, each device manager is structured to transmit a respective one of the transaction requests to the computer device associated with the device manager independently from any of the transaction requests transmitted by any others of the device managers. Preferably the bus agent also includes a response controller and a transaction queue. Each device manager stores a respective transaction response in the transaction queue in a transaction response field associated with the transaction request to which the transaction response is responsive. The response controller accesses the transaction responses in the transaction queue according to the first sequential order in which the transaction requests were received.

DETAILED DESCRIPTION OF THE INVENTION

Figure 1:
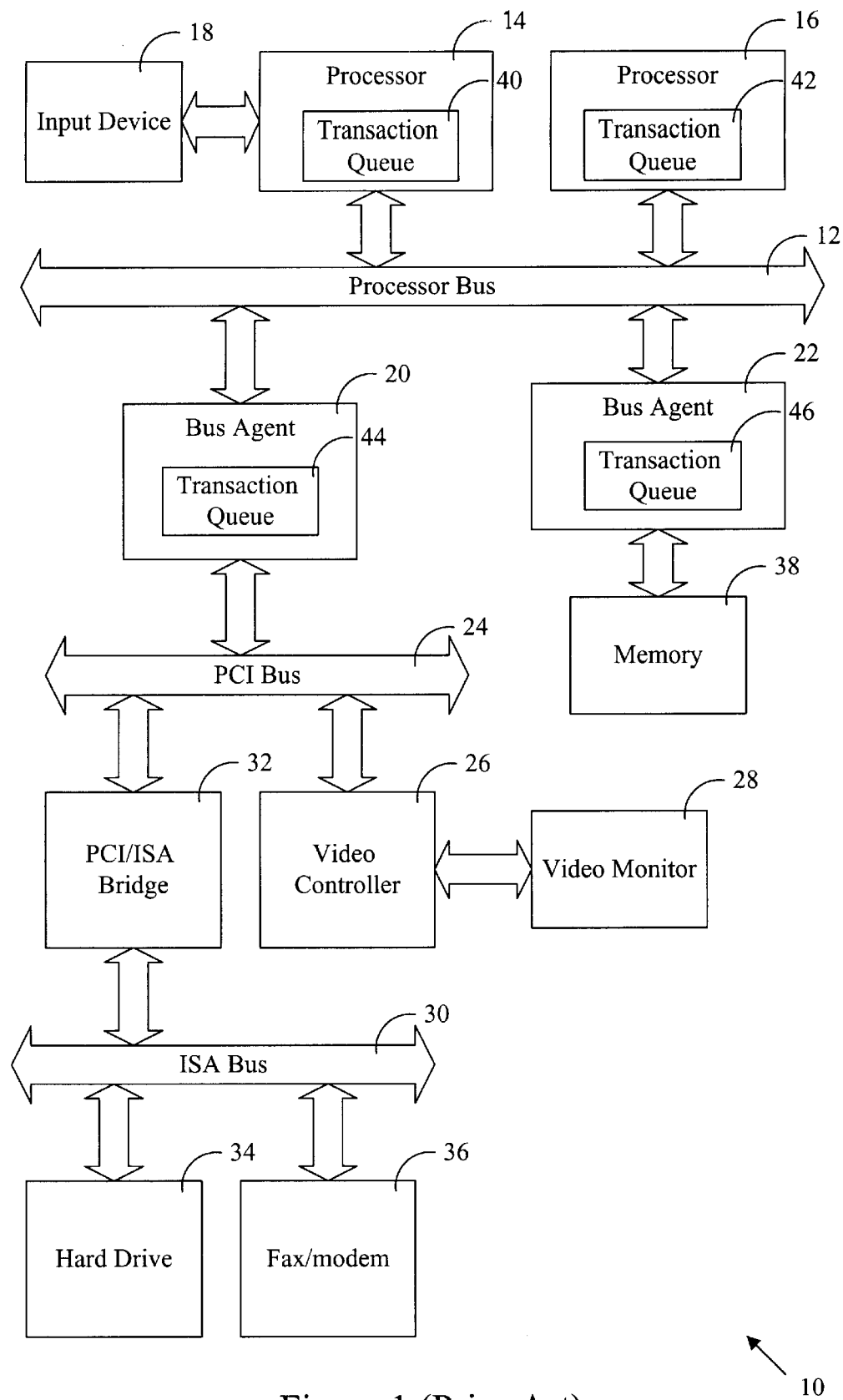
FIG. 1 is a block diagram of a prior art computer system.
Figure 2:
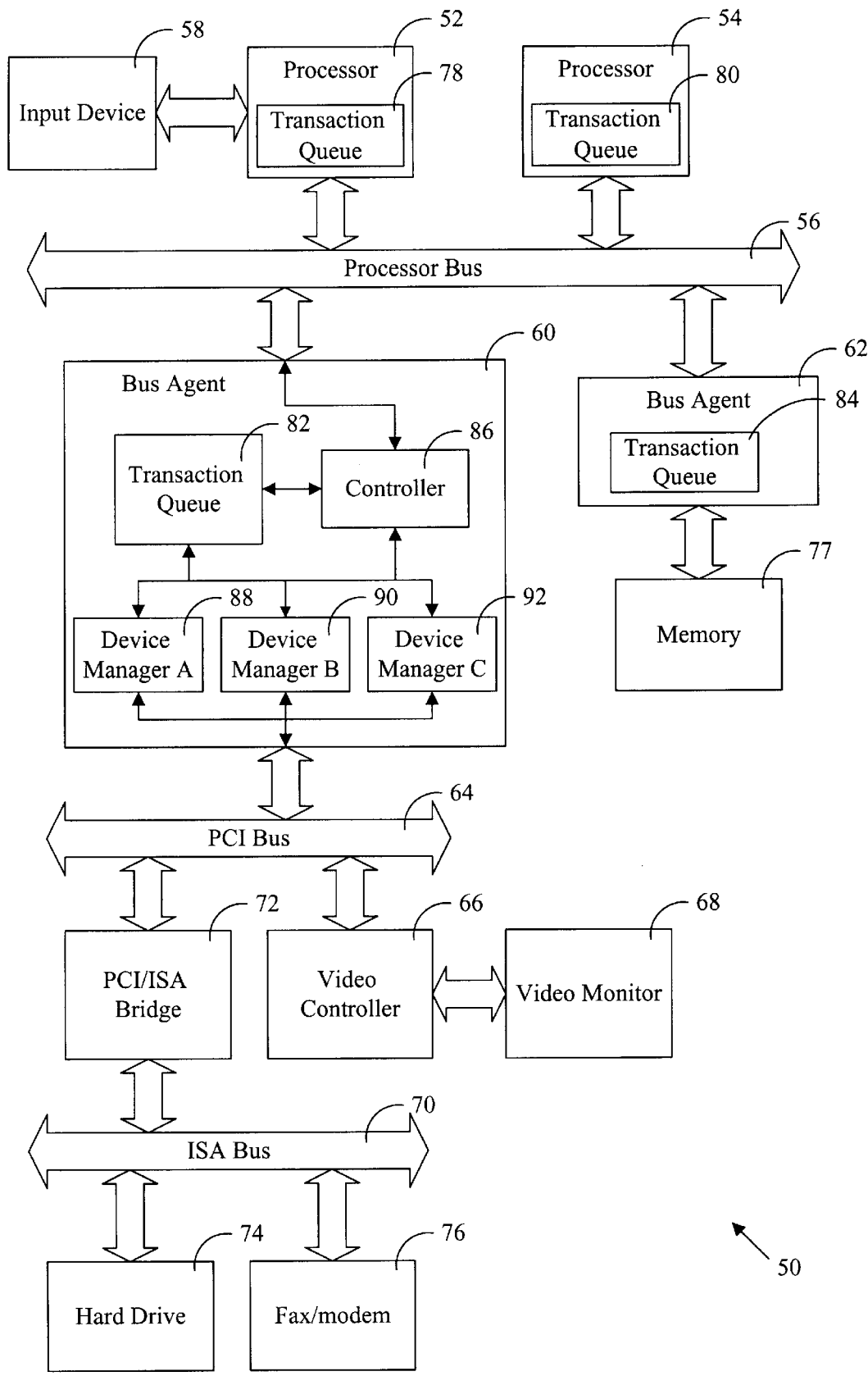
FIG. 2 is a block diagram of a computer system according to the present invention.

A computer system 50 that concurrently processes computer transactions according to one embodiment of the present invention is shown in FIG. 2. Like the prior art computer system 10 shown in FIG. 1, the computer system 50 includes a multiprocessor system architecture having first and second computer processors 52, 54 coupled to a processor bus 56. Coupled to the first computer processor 52 is an input device 58, such as a keyboard, mouse, or microphone, that inputs information to the first computer processor from a user. The computer system also includes a bus agent 60 coupled to the first and second computer processors 52, 54 via the processor bus 56. Coupled to the bus agent 60 is a hard drive 62, a Peripheral Component Interconnect (PCI) bus 64, and a main memory 66. The PCI bus 64 is coupled via a video controller 68 to a video monitor 70 that outputs information to the user. An Industry Standard Architecture (ISA) bus 72 also is coupled to the PCI bus 64 via a PCI/ISA bridge 74. Coupled to the ISA bus 30 are a fax/modem 76 and a printer 78.

The computer processors 52, 54 and bus agent 60 include transaction queues 80, 82, 84, respectively, for tracking all of the transactions that are transmitted across the processor bus 56. Each of the transaction queues 80–84 tracks every transaction transmitted on the processor bus 56 regardless of which of the computer modules 52, 54, 60 are involved in the transaction. For example, if the first processor 52 issues a transaction request to read data from the memory 66, the transaction request is entered into each of the transaction queues 80–84 even though the second processor 54 is not involved in the transaction.

The bus agent 60 also includes a transaction controller 86, a device manager A 88, a device manager B 90, and a device manager C 92 that together process the transactions directed to or from the bus agent 60. The transaction controller 86 and the device managers 88–92 enable the bus agent 60 to concurrently process transactions directed to the hard drive 62, the PCI bus 64, and/or the memory 66. Each of the device managers 88–92 is uniquely associated with one of the computer devices 62, 64, 66 coupled to the bus agent 60. In the embodiment shown in FIG. 2, the device manager A 88 is associated with the hard drive 62, the device manager B 90 is associated with the PCI bus 64, and the device manager C 92 is associated with the memory 66. Employing a separate device manager for each of the computer devices 62, 64, 66 coupled to the bus agent enables the transactions directed to any one of the computer devices to be processed independently from, and thus concurrently with, the transactions directed to the other computer devices coupled to the bus agent 60.

It will be appreciated that the bus agent 60 could include more or fewer device managers depending on how many computer devices capable of processing transactions are coupled to the bus agent. For example, another device manager can be directly coupled to the video controller 68 so that transaction requests directed to the video controller can be handled separately from and concurrently with transaction requests directed to the fax/modem 76 or the printer 78. Moreover, a second bus agent with one or more device managers may be employed to concurrently process transactions directed to one or more devices coupled to the second bus agent. Preferably, each computer device coupled to one of the bus agents is uniquely associated with a device manager so that transactions involving the computer device can be processed concurrently with transactions involving other computer devices coupled to one of the bus agents.

Figure 3:
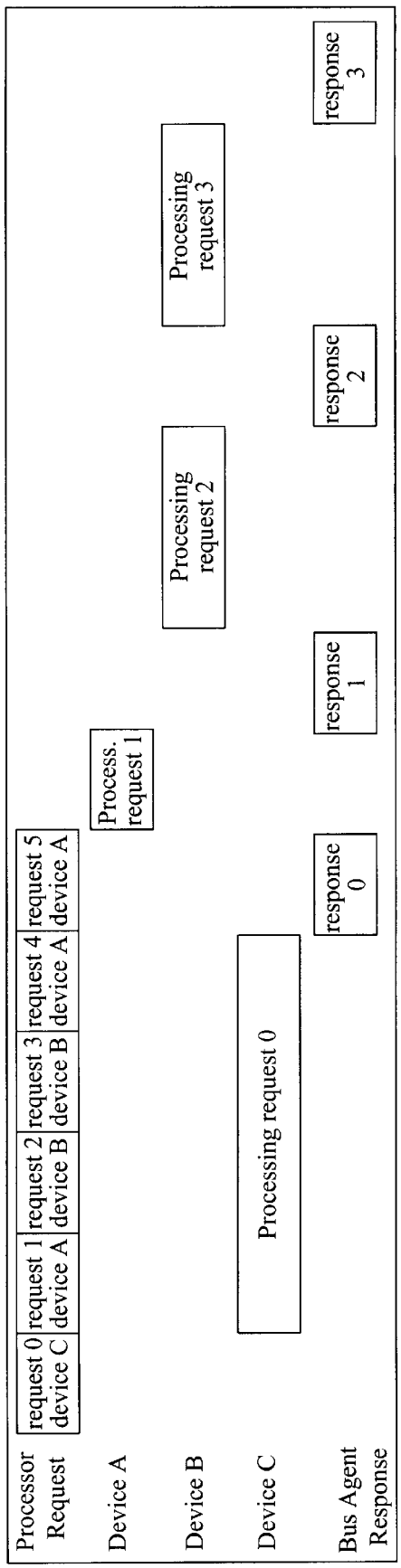
FIG. 3 is a timing diagram illustrating how the prior art computer system shown in FIG. 1 processes transactions non-currently.
Figure 4:
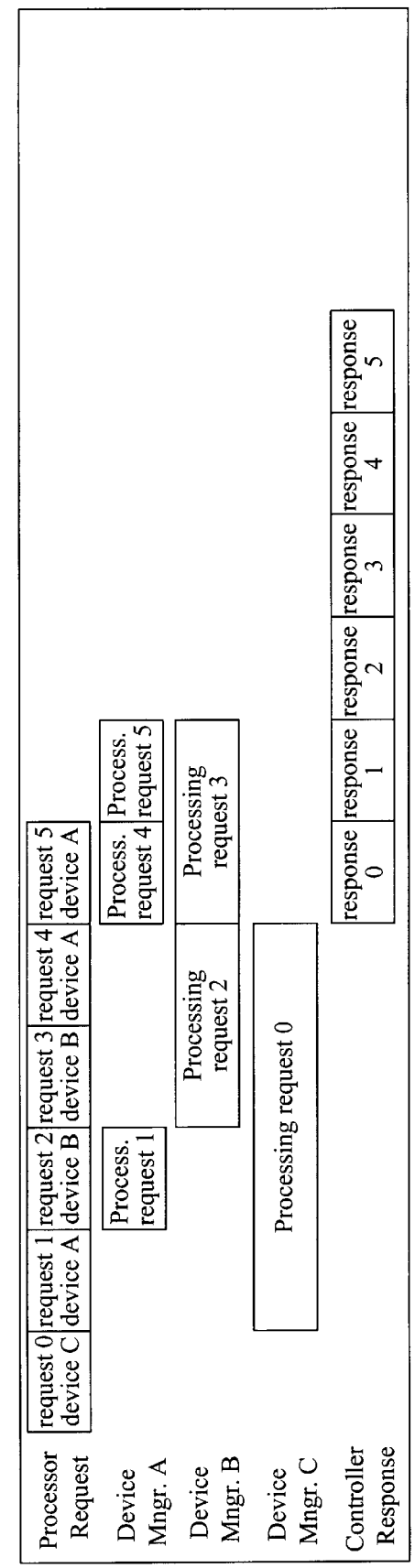
FIG. 4 is a timing diagram illustrating how the computer system shown in FIG. 2 processes transaction concurrently.

A comparison of the transaction processing timing of the prior art system shown in FIG. 3 with the transaction processing timing of the present invention shown in FIG. 4 shows the processing efficiency obtained by the present invention. In FIG. 3, either or a combination of the first and second processors 14, 16 issues six consecutive transaction requests labeled 0–5. Assuming that transaction request 0 is directed to a computer device A, such as the hard drive 34, then the computer device A processes the transaction request and transmits a transaction response to the first bus agent 20 which forwards the transaction response to the appropriate one of the processors 14, 16. After the first bus agent 20 has forwarded to the processor the transaction response 0 to transaction request 0, then the first bus agent can transmit the transaction request 1 to a computer device C, such as the video controller 26. Computer device C processes the transaction request 1, transmits a transaction response 1 to the bus agent, and the bus agent forwards the transaction response 1 to the appropriate processor. Transaction requests 2–5 are handled similarly, that is, the first bus agent 20 must transmit to the appropriate one of the processors 14, 16 a response to one transaction request before transmitting the next transaction request to the appropriate computer device for processing.

The timing diagram of FIG. 4 shows how the present invention concurrently processes transactions directed to the computer devices 62, 64, 66 coupled to the bus agent 60. In response to receiving the first transaction request 0 directed to a computer device A, such as the hard drive 62, the device manager A 88 forwards the transaction request 0 to the computer device A with which it is associated. While the computer device A is processing the transaction request 0, the device manager C 92 forwards the transaction request 1 to a computer device C, such as the memory 66, with which it is associated. Similarly, the device manager B 90 forwards to its associated computer device B, such as the PCI bus 64, the transaction request 2 for processing while the computer device A continues to process transaction request 0. After device manager A 92 receives from the computer device A a transaction response 0 in response to the transaction request 0, the transaction controller 86 forwards the transaction response 0 to the appropriate one of the processors 52, 54. In addition, because the device manager C 88 and computer device C were able to process the transaction request 1 while the transaction request 0 was being processed, the transaction controller 86 can transmit the transaction response 1 immediately following the transmittal of the transaction response 0.

The concurrent processing of the present invention as illustrated in FIG. 4 contrasts with the prior art non-concurrent transaction processing shown in FIG. 3 in which the first bus agent 20 and the computer device C cannot even begin to process the transaction request 1 until the transaction response 0 is sent to the appropriate one of the processors 14, 16. Moreover, a comparison of FIGS. 3 and 4 shows that the present invention can concurrently process and transmit transaction responses 0–5 in the same amount of time as it takes the prior art system to process three transactions and transmit transaction responses 0–2. In addition, the present invention maximizes the processing ability of high speed devices, such as computer device C, by enabling the high speed devices to process transactions concurrently with relatively slow devices, such as computer device A, rather than requiring the high speed devices to wait for the relatively slow devices. Conversely, the present invention enables the relatively slow devices to begin processing earlier, and thereby finish earlier, than is possible using prior art non-concurrent transaction processing systems.

Figure 5:
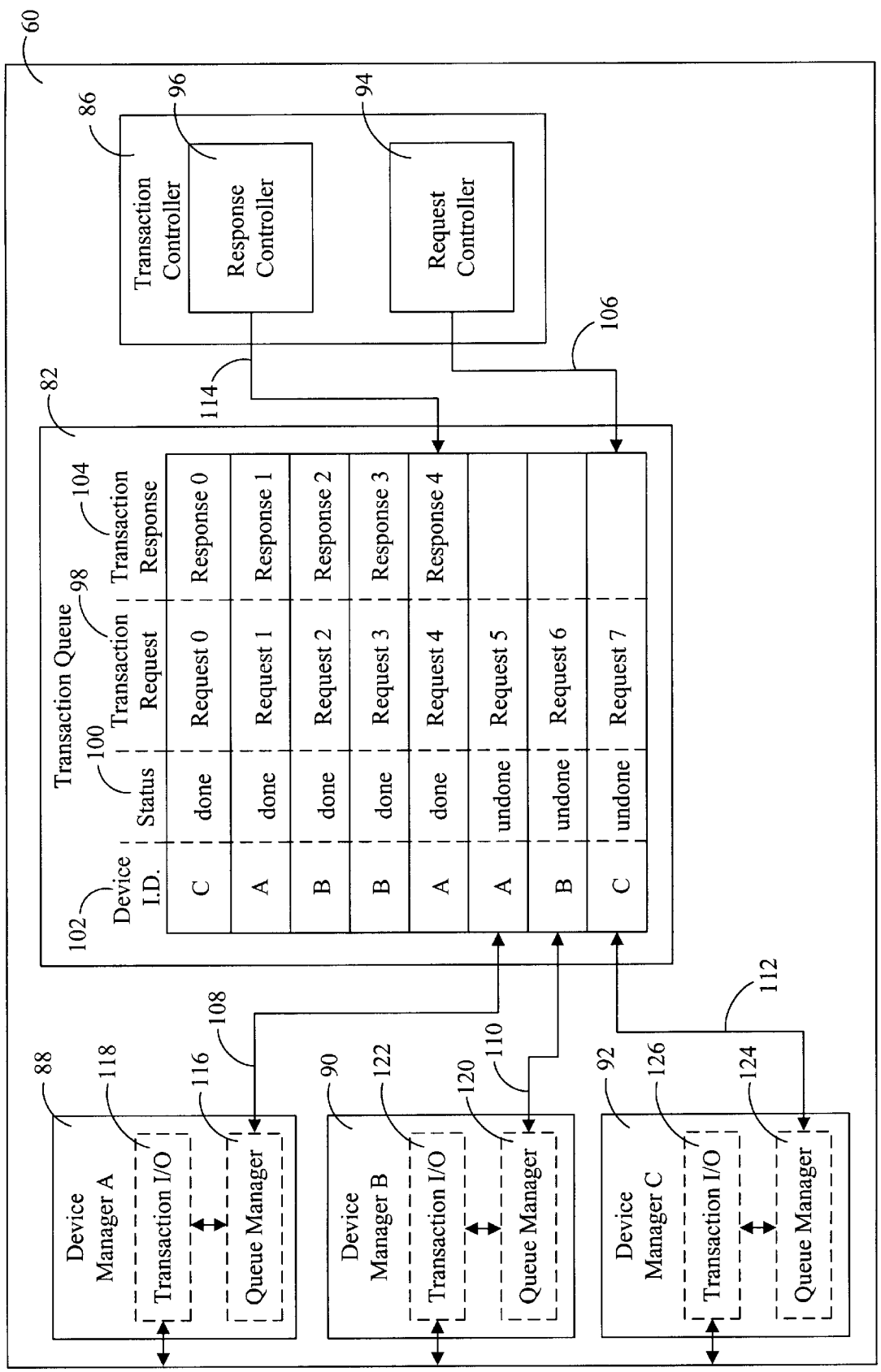
FIG. 5 is a block diagram of a bus agent employed in the computer system shown in FIG. 2.
Figure 2:
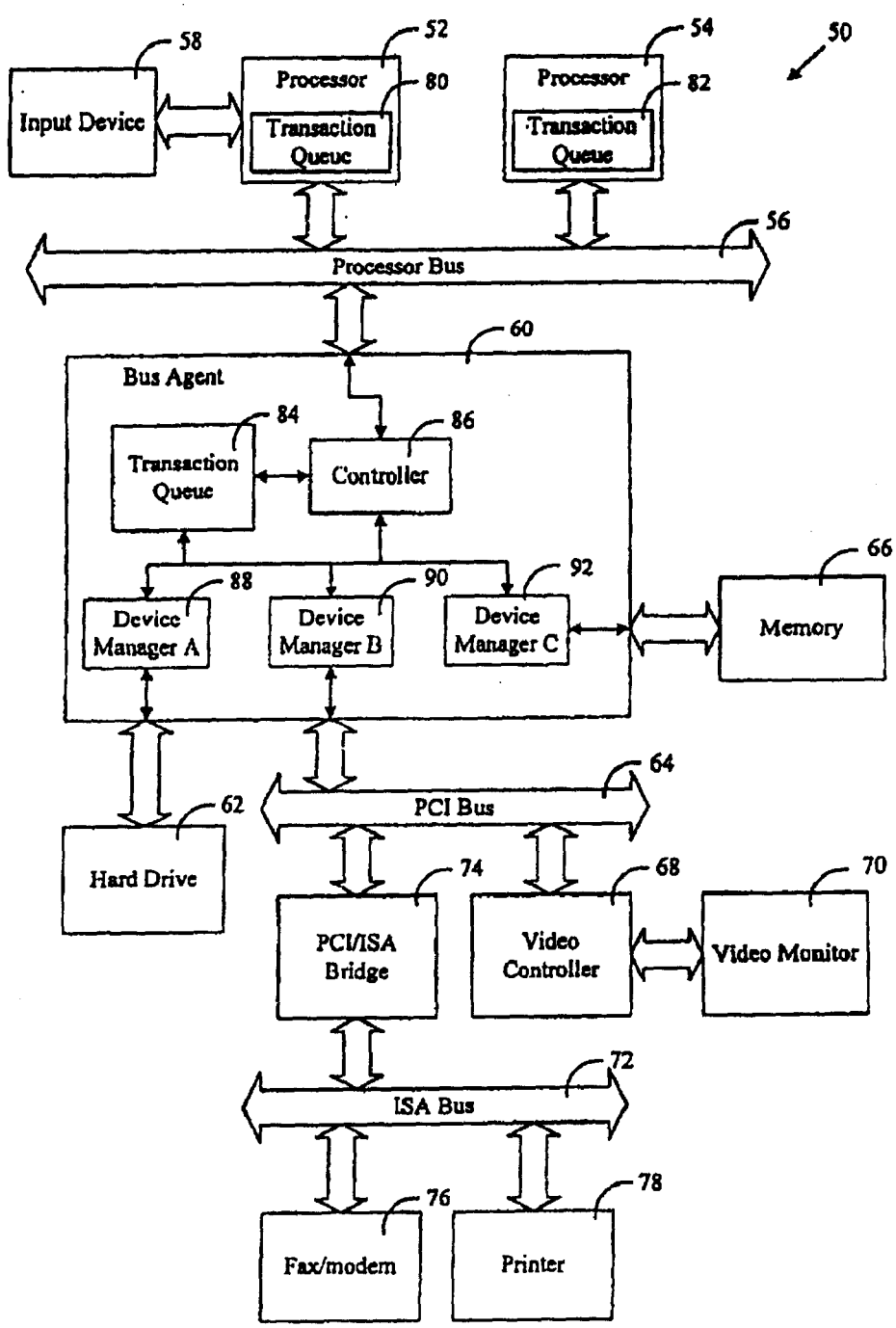
Figure 2:
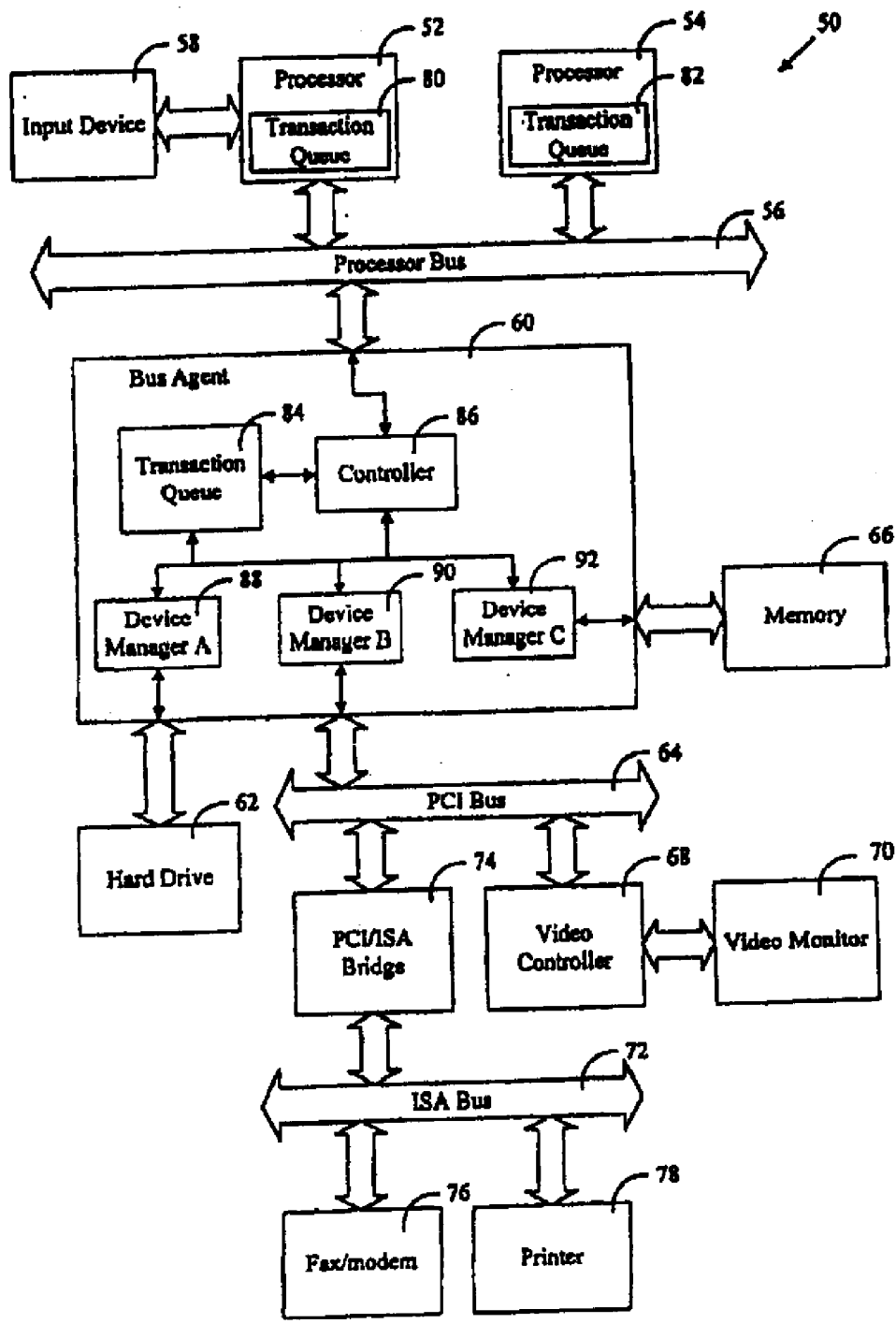

A block diagram of the bus agent 60 is shown in FIG. 5. The transaction controller 86 includes a request controller 94 and a response controller 96 that keep track of transaction requests and transaction responses, respectively. The transaction queue 82 includes four fields: A transaction request field 98 that stores each transaction request, a status field 100 that identifies the status of each transaction, a device identifier field 102 that identifies the computer device to which the transaction request is directed, and a transaction response field 104 that stores each transaction response. For example, the transaction 0 was directed to computer device A and has already been processed as indicated by the "done" in the status field 100. Similarly, transactions 1–4 have each already been processed by the appropriate device manager and computer device as indicated in the status field 100 for the transactions 1–4.

It should be appreciated that the transaction queue 82 can be employed to track all of the transactions transmitted across the processor bus 56 regardless of whether the bus agent 60 is involved in the transactions. Alternatively, the bus agent 60 can include separate transaction queues to track transactions involving the bus agent 60 separately from transactions not involving the bus agent 60.

Each transaction request is entered into the transaction queue 82 by the request controller 94. The request controller 94 employs a request pointer 106 to index the transaction request that has most recently been entered into the transaction queue 82. The request controller 94 also decodes each transaction request received by the first bus agent 60 and enters in the device identifier field 102 the identifier of the device to which the transaction request is directed. In FIG. 5, the request controller 94 has entered into the transaction queue 82 each of the transaction requests 0–7, of which transaction request 7 was most recently entered as indicated by the request pointer 104. Preferably, the request controller 94 enters into the transaction queue 82 the entire transaction request. Alternatively, the request controller 99 could enter only an indication of each transaction request in the transaction queue 82 and store the actual transaction request in a separate storage location.

The device managers 88, 90, 92 employ queue pointers 108 and 112, respectively, to track the transactions directed to their associated computer devices 62, 64, 66. In response to the request controller 94 inserting a new transaction request in the transaction queue 82, each of the device managers 88–92 check the device identifier field 102 to determine if the new transaction request is being directed to the computer device associated with the device manager. For example, the device identifier field 102 indicates that the transaction request 5 is directed to the computer device A (e.g. hard drive 62), so the device manager A 88 causes its queue pointer 108 to point to the transaction request 5 in the transaction queue 82. Similarly, the device manager B 90 causes its queue pointer 110 to point to the transaction request 6 in the transaction queue 82 because the device identifier field 102 indicates that the transaction request 6 is directed to the computer device B (e.g., PCI bus 64). Likewise, the device manager C 92 causes its queue pointer 112 to point to the transaction request 7 because the device identifier field 102 indicates that the transaction request 7 is directed to the computer device C (e.g., memory 66).

In response to receiving a transaction request from its associated device manager, each of the computer devices transmits a transaction response to its associated device manager. For example, in response to receiving transaction request 4 from the device manager A 88, the computer device A transmits a transaction response 4 to the device manager A. In response to receiving the transaction response 4, the device manager A 88 updates the status field 100 for transaction 4 to indicate that the device manager A 88 and the computer device A have finished processing the transaction request 4.

The response controller 96 sequentially checks the status field 100 of each transaction to determine when the transaction has been completely processed by the appropriate device manager and computer device. Upon determining that a transaction has been processed by the appropriate device manager and computer device, the transaction controller transmits the transaction response across the processor bus 56 to whichever one of the computer processors 52, 54 transmitted the transaction request that is being responded to by the transaction response. The response controller 96 employs a response pointer 114 to keep track of which transaction response is next to be transmitted across the processor bus 56. In FIG. 5, the response controller 96 has already transmitted transaction responses 0–3 across the processor bus 56, and thus, the response pointer 114 points to the transaction 4.

The device manager A 88 includes a queue manager 116 that interfaces the device manager A with the transaction queue 82. In particular, the queue manager 116 checks each new transaction request that is entered into the transaction queue 82 by the request controller 94 to determine whether the device identifier field 102 indicates that the transaction request is directed to the computer device A associated with the device manager A. If the transaction request is directed to the computer device A, then the queue manager 116 directs its queue pointer 106 at the transaction request and retrieves that transaction request from the transaction queue 82. In addition, when the device manager A 88 receives a transaction response from the computer device A in response to a transaction request, the queue manager 116 updates the status field 100 in the transaction queue to indicate that the device manager A has completed its processing of the transaction. The device manager A then checks the device identifier field 102 of the transaction queue 82 to determine whether any additional transaction requests have been directed to computer device A. If so, the device manager A begins processing the next transaction request directed to computer device A.

The device manager A 88 also includes a transaction I/O module 118 that interfaces the device manager A with its associated computer device A. In the computer system 50 shown in FIG. 2, the device manager A 88 is directly coupled to the hard drive 62, and thus, the transaction I/O module 118 communicates directly with the hard drive. In response to receiving a transaction request from the transaction queue 82, the queue manager 116 forwards the transaction request to the transaction I/O module 118. The transaction I/O module 118 transmits the transaction request to the hard drive 62 for processing. Similarly, when the hard drive 62 responds to the transaction request by creating and transmitting a transaction response, the transaction I/O module 118 receives that transaction response from the hard drive 62.

In response to receiving a transaction response from the hard drive 62, the transaction I/O module 118 stores the transaction response in the transaction response field 104 of the transaction queue 82. After the queue manager 116 has updated the status field 100 of the transaction to indicate that a transaction response has been received, the response controller 96 accesses the transaction response stored in transaction response field 104. The response controller 96 retrieves the transaction response from the transaction response field 104 and transmits the transaction response across the processor bus 56 to the appropriate one of the processors 52, 54. The transaction response field 104 may be limited to storing a single transaction at a time. Alternatively, the transaction response field 104 can be designed to store plural transaction responses in order to enable the device manger A 88 and the computer device A to process plural transactions concurrently with transactions processed by the other device managers 90–92.

Like the device manager A 88, the device manager B 90 includes a queue manager 120 and a transaction I/O module 122. Similarly, the device manager C 92 also includes a queue manager 124 and a transaction I/O module 126. The queue managers 120, 124 and the transaction I/O modules 122, 126 operate similarly to the queue manager 116 and the transaction I/O module 118 of the device manager A 88 as discussed above.

Based on the foregoing discussion, it will be appreciated that the invention provides concurrent processing of computer transactions. In particular, the transaction queue, transaction controller, and device managers of each bus agent enable each bus agent to process transaction requests concurrently and still transmit transaction responses across the processor bus according to the sequential order in which the transaction requests were received. Such concurrent processing enables the present invention to process transactions faster than is enabled by prior art non-concurrent transaction processing systems.

It should be understood that even though numerous advantages of the present invention have been set forth in the foregoing description, the above disclosure is illustrative only. Changes may be made in detail and yet remain within the broad principles of the present invention.

What is claimed:

1. A computer system for concurrent transaction processing, comprising:

a computer processor that issues a plurality of transaction requests;

a computer bus coupled to the computer processor;

a plurality of computer devices for responding to the transaction requests from the computer processor; and a bus agent coupled between the computer bus and the plurality of computer devices the bus agent including a transaction queue that stores at least some information pertaining to each transaction request, a first request path along which transaction requests are routed from the computer bus to a first one of the plurality of computer devices, and a second request path along which transaction requests are routed from the computer bus to a second one of the plurality of computer devices, the bus agent initiating processing of a subsequent transaction request before processing is completed of an earlier transaction request for which the processing was initiated by the bus agent.

2. The computer system of claim 1 wherein the bus agent comprises a request controller that is structured to insert an indication of each of the plurality of transaction requests into the transaction queue according to the order in which the transaction requests were received by the bus agent.

3. The computer system of claim 1 wherein the bus agent comprises a response controller that is structured to use the transaction queue to transmit responses to the plurality of transaction requests according to the order in which the transaction requests were received by the bus agent.

4. The computer system of claim 1 wherein the bus agent comprises a plurality of device managers that are structured to use the transaction queue to keep track of the transaction requests received from the computer processor via the computer bus, each of the plurality of device managers being associated with a respective one of the plurality of computer devices and being structured to transmit a respective one of the plurality of transaction requests to the computer device associated with the device manager independently from any of the plurality of transaction requests transmitted by any others of the plurality of device managers, the first request path including a first one of the device managers, and the second request path including a second one of the device managers.

5. The computer system of claim 4 wherein the transaction queue comprises a status field that is structured to indicate whether a response to each of the transaction requests has been received by the bus agent, each device manager setting the status field for one of the transaction requests to indicate that a response has been received upon receiving the response from the computer device associated with the device manager.

6. The computer system of claim 4 wherein each device manager comprises a queue manager that is structured to maintain a queue pointer that points in the transaction queue to a next transaction request for the computer device associated with the device manager.

7. The computer system of claim 4 wherein each device manager comprises a transaction I/O module coupled to the computer device associated with the device manager, the transaction I/O module being structured to transmit transaction requests to, and receive transaction requests from, the computer device associated with the device manager.

8. The computer system of claim 1 wherein the transaction queue comprises a transaction response field that is structured to store responses to the transaction requests before the responses are transmitted on the computer bus.

9. A concurrent transaction bus agent adapted for use with a computer system having a plurality of computer devices that are adapted to respond to received transaction requests, the bus agent comprising:

a transaction queue that records each transaction request;

a first request path along which transaction requests are routed to a first port that is adapted to be coupled to a first one of the plurality of computer devices;

a second request path along which transaction requests are routed to a second port that is adapted to be coupled to a second one of the plurality of computer devices; and a transaction controller initiating processing of a subsequent transaction request before processing is completed of an earlier transaction request for which the processing was initiated by the bus agent.

10. The concurrent transaction bus agent of claim 9 wherein the transaction controller comprises a request controller that is structured to insert an indication of each of the plurality of received transaction requests into the transaction queue according to the order in which the transaction requests are received.

11. The concurrent transaction bus agent of claim 9 wherein the transaction controller comprises a response controller that is structured to use the transaction queue to transmit responses to the plurality of received transaction requests according to the order in which the transaction requests are received.

12. The concurrent transaction bus agent of claim 9 wherein the bus agent further comprises a plurality of device managers that are structured to use the transaction queue to keep track of the received transaction requests, each of the plurality of device managers being associated with a respective one of the plurality of ports and being structured to transmit a respective one of the plurality of transaction requests to the port associated with the device manager independently from any of the plurality of transaction requests transmitted by any others of the plurality of device managers, the first request path including a first one of the device managers, and the second request path including a second one of the device managers.

13. The concurrent transaction bus agent of claim 12 wherein the transaction queue comprises a status field that is structured to indicate whether a response to each of the transaction requests has been received by the bus agent, each device manager setting the status field for one of the transaction requests to indicate that a response has been received upon receiving the response from the port associated with the device manager.

14. The concurrent transaction bus agent of claim 12 wherein each device manager comprises a queue manager that is structured to maintain a queue pointer that points in the transaction queue to a next transaction request for the port associated with the device manager.

15. The concurrent transaction bus agent of claim 12 wherein each device manager comprises a transaction I/O module coupled to the port associated with the device manager, the transaction I/O module being structured to transmit transaction requests to, and receive transaction requests from, the port associated with the device manager.

16. The concurrent transaction bus agent of claim 9 wherein the transaction queue comprises a transaction response field that is structured to store responses to the transaction requests before the responses are transmitted.

17. A computer system for concurrent transaction processing, comprising:

a computer processor that issues a plurality of transaction requests;

a computer bus coupled to the computer processor;

a plurality of computer devices for responding to the transaction requests from the computer processor; and a bus agent coupled between the computer bus and the plurality of computer devices, including a first request path along which transaction requests are routed from the computer bus to a first one of the plurality of computer devices, and a second request path along which transaction requests are routed from the computer bus to a second one of the plurality of computer devices, the bus agent being structured to initiate processing of a subsequent transaction request before processing is completed of an earlier transaction request for which the processing was initiated by the bus agent.

18. The computer system of claim 17 wherein the bus agent comprises a transaction queue that that records each transaction request.

19. The computer system of claim 18 wherein the bus agent comprises a request controller that is structured to insert an indication of each of the plurality of transaction requests into the transaction queue according to the order in which the transaction requests were received by the bus agent.

20. The computer system of claim 18 wherein the bus agent comprises a response controller that is structured to use the transaction queue to transmit responses to the plurality of transaction requests according to the order in which the transaction requests were received by the bus agent.

21. The computer system of claim 18 wherein the bus agent comprises a plurality of device managers that are structured to use the transaction queue to keep track of the transaction requests received from the computer processor via the computer bus, each of the plurality of device managers being associated with a respective one of the plurality of computer devices and being structured to transmit a respective one of the plurality of transaction requests to the computer device associated with the device manager independently from any of the plurality of transaction requests transmitted by any others of the plurality of device managers, the first request path including a first one of the device managers, and the second request path including a second one of the device managers.

22. The computer system of claim 21 wherein the transaction queue comprises a status field that is structured to indicate whether a response to each of the transaction requests has been received by the bus agent, each device manager setting the status field for one of the transaction requests to indicate that a response has been received upon receiving the response from the computer device associated with the device manager.

23. The computer system of claim 21 wherein each device manager comprises a queue manager that is structured to maintain a queue pointer that points in the transaction queue to a next transaction request for the computer device associated with the device manager.

24. The computer system of claim 21 wherein each device manager comprises a transaction I/O module coupled to the computer device associated with the device manager, the transaction I/O module being structured to transmit transaction requests to, and receive transaction requests from, the computer device associated with the device manager.

25. The computer system of claim 18 wherein the transaction queue comprises a transaction response field that is structured to store responses to the transaction requests before the responses are transmitted on the computer bus.

26. A computer system for concurrent transaction processing, comprising:

a computer processor that issues a plurality of transaction requests;

a computer bus coupled to the computer processor;

a plurality of computer devices for responding to the transaction requests from the computer processor; and a bus agent coupled between the computer bus and the plurality of computer devices, including a first request path along a first transaction request is routed from the computer bus to a first one of the plurality of computer devices, and a second request path along which a second transaction request is routed from the computer bus to a second one of the plurality of computer devices, the second transaction request being received from the computer bus after the first transaction request has been received from the computer bus, the bus agent being structured to transmit the second transaction request to the second computer device before the bus agent has received a transaction response to the first transaction request from the first computer device.

27. The computer system of claim 26 wherein the bus agent comprises a transaction queue that that records each transaction request.

28. The computer system of claim 27 wherein the bus agent comprises a request controller that is structured to insert an indication of each of the plurality of transaction requests into the transaction queue according to the order in which the transaction requests were received by the bus agent.

29. The computer system of claim 27 wherein the bus agent comprises a response controller that is structured to use the transaction queue to transmit responses to the plurality of transaction requests according to the order in which the transaction requests were received by the bus agent.

30. The computer system of claim 27 wherein the bus agent comprises a plurality of device managers that are structured to use the transaction queue to keep track of the transaction requests received from the computer processor via the computer bus, each of the plurality of device managers being associated with a respective one of the plurality of computer devices and being structured to transmit a respective one of the plurality of transaction requests to the computer device associated with the device manager independently from any of the plurality of transaction requests transmitted by any others of the plurality of device managers the first request path including a first one of the device managers, and the second request path including a second one of the device managers.

31. The computer system of claim 30 wherein the transaction queue comprises a status field that is structured to indicate whether a response to each of the transaction requests has been received by the bus agent, each device manager setting the status field for one of the transaction requests to indicate that a response has been received upon receiving the response from the computer device associated with the device manager.

32. The computer system of claim 30 wherein each device manager comprises a queue manager that is structured to maintain a queue pointer that points in the transaction queue to a next transaction request for the computer device associated with the device manager.

33. The computer system of claim 30 wherein each device manager comprises a transaction I/O module coupled to the computer device associated with the device manager, the transaction I/O module being structured to transmit transaction requests to, and receive transaction requests from, the computer device associated with the device manager.

34. The computer system of claim 27 wherein the transaction queue comprises a transaction response field that is structured to store responses to the transaction requests before the responses are transmitted on the computer bus.

\* \* \* \* \*

UNITED STATES PATENT AND TRADEMARK OFFICE
CERTIFICATE OF CORRECTION

PATENT NO. : 5,991,843
DATED : November 23, 1999
INVENTOR(S) : A. Kent Porterfield et al.

It is certified that error appears in the above-identified patent and that said Letters Patent is hereby corrected as shown below:

Drawings,
Replace Figure 2 with the following corrected Figure 2:

Signed and Sealed this

Thirteenth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 5,991,843
DATED : November 23, 1999
INVENTOR(S) : A. Kent Porterfield et al.

It is certified that error appears in the above-identified patent and that said Letters Patent is hereby corrected as shown below:

Drawings,
Replace Figure 2 with the following corrected Figure 2:

This certificate supersedes Certificate of Correction issued April 13, 2004.

Signed and Sealed this

Fourteenth Day of June, 2005

JON W. DUDAS
*Director of the United States Patent and Trademark Office*